United States Patent
Cox

(10) Patent No.: US 9,404,546 B2
(45) Date of Patent: Aug. 2, 2016

(54) COPPER FREE FRICTION MATERIAL COMPOSITION

(71) Applicants: Bosch Automotive Service Solutions LLC, Warren, MI (US); Robert Bosch GmbH, Stuttgart (DE)

(72) Inventor: Roy L. Cox, Wheaton, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/308,081

(22) Filed: Jun. 18, 2014

(65) Prior Publication Data

US 2015/0369321 A1   Dec. 24, 2015

(51) Int. Cl.
*F16D 69/00*   (2006.01)
*F16D 69/02*   (2006.01)

(52) U.S. Cl.
CPC .................................... *F16D 69/026* (2013.01)

(58) Field of Classification Search
CPC ..... F16D 69/028; F16D 65/092; F16D 69/02; F16D 69/025; F16D 69/026; F16D 69/027
USPC ......... 188/251 A, 251 M, 257; 523/149, 152, 523/155, 156, 157
See application file for complete search history.

(56) References Cited

U.S. PATENT DOCUMENTS

| | | | |
|---|---|---|---|
| 1,588,757 A | 6/1926 | Leonard | |
| 1,637,894 A | 8/1927 | Crane | |
| 4,180,622 A | 12/1979 | Burkhard et al. | |
| 4,262,788 A | 4/1981 | Yamamoto et al. | |
| 5,106,887 A | 4/1992 | Horiguchi | |
| 5,957,251 A | 9/1999 | Jones et al. | |
| 6,481,555 B1 | 11/2002 | Hell et al. | |
| 8,034,427 B2 | 10/2011 | Unno et al. | |
| 8,197,585 B2 | 6/2012 | Pearce et al. | |
| 2003/0092795 A1 | 5/2003 | Miyaki et al. | |
| 2003/0175543 A1 | 9/2003 | Lo | |
| 2003/0200898 A1 | 10/2003 | Ohe et al. | |
| 2012/0174747 A1* | 7/2012 | Hummel et al. | 89/36.02 |
| 2013/0037360 A1 | 2/2013 | Chen et al. | |
| 2013/0240310 A1* | 9/2013 | Baba et al. | 188/251 A |
| 2014/0202805 A1* | 7/2014 | Unno et al. | 188/251 A |

FOREIGN PATENT DOCUMENTS

GB   505922 A   5/1939

* cited by examiner

*Primary Examiner* — Pamela Rodriguez
(74) *Attorney, Agent, or Firm* — Maginot Moore & Beck LLP

(57) ABSTRACT

A copper-free friction material composition for a brake lining includes a fibrous form of an aluminum magnesium alloy, and a solid lubricant having a sulfur. The friction material composition can be disposed over at least a region of a backing plate of a brake pad to form a brake lining. The aluminum magnesium alloy contains about 4.5% to about 5.6% magnesium by weight. The friction material composition includes, by weight, about 5% to about 6% of the solid lubricant, about 5% to about 9.75% of the fibrous form of an aluminum magnesium alloy, about 7% to about 10% of an organic filler composition, and about 13% to about 17% of an abrasive composition, and can also include an inorganic filler, and a binder that develops the other components in the friction material composition into a thermosetting matrix. The friction material composition has a dynamic coefficient of friction of about 0.43.

18 Claims, 3 Drawing Sheets

COPPER FREE FRICTION MATERIAL COMPOSITION

TECHNICAL FIELD

This disclosure relates generally to friction materials, and, more particularly, to friction coatings for brake linings of a vehicle, such as an automotive vehicle.

BACKGROUND

Brake linings are one of the most consumed elements used in vehicles, and have a significant impact on vehicle safety and operability. Factors including brake pad longevity, durability, and weight can dramatically affect environmental and economic costs of vehicle production, operation, and maintenance. Brake linings can also have an additional environmental impact due to particulates released into the environment by wear during use, compounded by the immense number of vehicles in operation daily.

Traditionally, brake systems were made using asbestos-based friction materials. As negative factors associated with the use of asbestos became known, copper-based friction materials gained prominence. However, the favorability of copper-based friction materials has waned due to economic costs imposed by a finite availability of copper as a resource and due to increasing concerns over harmful emission of copper particulates into the environment. Indeed, several state legislatures have proposed or enacted legislation limiting use of copper in brake lining materials due to risks of contaminating aquatic environments with copper.

Brake assemblies are utilized in a wide variety of vehicles, such as cars, trucks, airplanes, bicycles, and motorcycles. FIG. 1 illustrates a side view of a customary brake pad assembly 10 for a motor vehicle, and FIG. 2 illustrates a cross-section view of the brake pad assembly of FIG. 1. The brake pad assembly 10 includes a pair of brake pads 12 positioned on opposite sides of a rotating body such as a brake disk 14 that rotates with a wheel 16. When actuated, such as by an actuator 18, a pushing member such as a caliper 20 pinches the brake disk 14 between the pair of brake pads 12 to apply a compression force resulting in friction that slows rotation of the wheel 16.

FIG. 3 illustrates a perspective view of a brake pad 100. Typically, a brake pad 100 includes a pad of friction material lining 102 attached to a backing plate 104. The backing plate 104 is typically a solid metal plate, and the friction material lining 102 is generally attached to the backing plate 104 via rivets or high-temperature adhesives. Friction material linings are generally composed of relatively soft but tough and heat-resistant materials with a high coefficient of dynamic friction $\mu_d$, which for typical brake pads, ranges from about 0.35 to about 0.42.

Since the friction material lining 102 is the portion of the braking assembly which converts a vehicle's kinetic energy into heat, it is desirable for the friction material lining 102 to be able to withstand high temperatures without excessive wear. Copper-free friction materials have been proposed. However, while excluding copper may result in friction materials that approach some performance aspects of copper-based friction materials, such friction materials often include undesirable properties, such as a decreased integrity, longevity, thermal tolerance, acoustic properties, or hardness. U.S. Patent Application Publication 2013/0037360 by Chen et al. discloses a substantially copper-free friction material for brake pads that uses steel fibers to match some performance aspects of copper-based friction materials.

Therefore, what is needed is a friction material for brake linings that is copper-free, and that exhibits improved performance relative to copper-based friction materials without sacrificing other desirable or necessary properties of the brake lining.

SUMMARY

The following is a brief summary of subject matter that is described in greater detail herein. This summary is not intended to be limiting as to the scope of the claims.

A friction material composition for a brake lining of an automobile brake assembly includes a fibrous form of an aluminum magnesium alloy and a solid lubricant that includes a sulfur. In one aspect, the friction material composition is copper-free. In another aspect, the solid lubricant is lead-free. In a further aspect, the fibrous form of an aluminum magnesium alloy has a magnesium content of about 4.5% to about 5.6% by weight.

In an embodiment, the friction material composition includes, by weight, about 5% to about 6% of the solid lubricant, about 5% to about 9.75% of the fibrous form of an aluminum magnesium alloy, about 7% to about 10% of an organic filler composition, and about 13% to about 17% of an abrasive composition. The friction material composition can also include an inorganic filler. The friction material composition can also include a binder that forms other components in the friction material composition into a thermosetting matrix.

In an example, the friction material composition has a dynamic coefficient of friction $\mu_d$ of about 0.43. In one aspect of the disclosure, the friction material composition exhibits an increased structural reinforcement and strength relative to friction materials having non-alloyed fibers.

In an embodiment, the friction material composition is disposed over at least a region of a backing plate of a brake pad in order to form a brake lining of the brake pad. In an embodiment, a brake assembly includes a plurality of brake pads having a friction lining according to the present disclosure.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
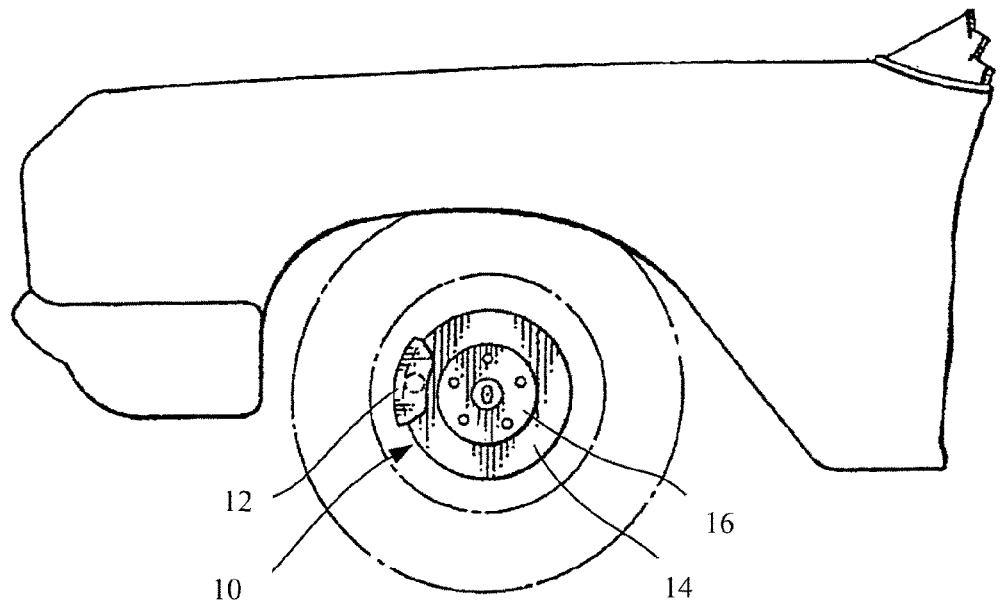
FIG. 1 is a side view of a customary brake pad assembly.
Figure 2:
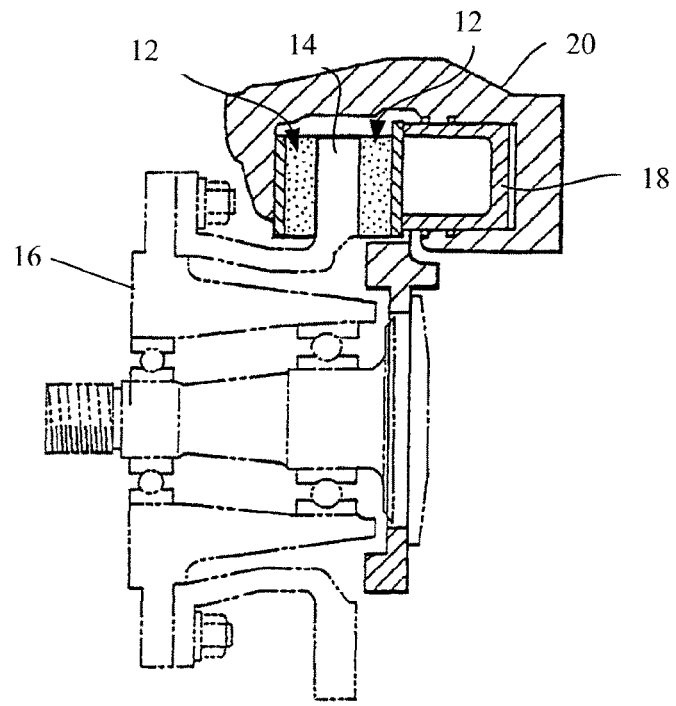
FIG. 2 is a cross-section view of the brake pad assembly of FIG. 1.
Figure 3:
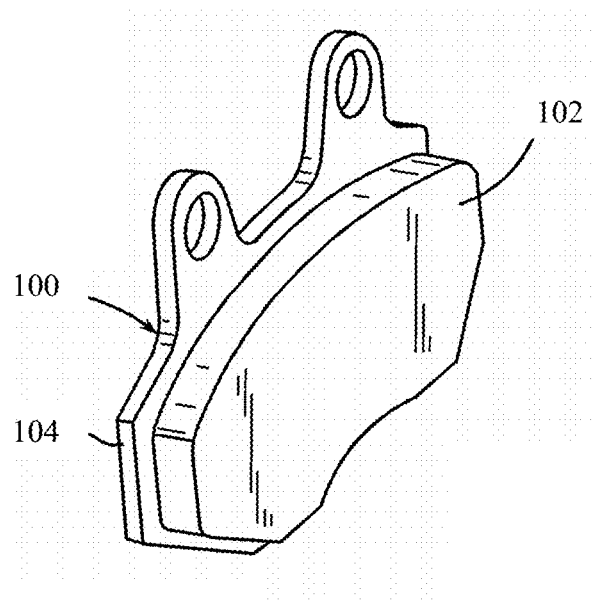
FIG. 3 is a perspective view of a brake pad.

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

In an embodiment according to the present disclosure, the friction material 102 includes a fibrous form of an aluminum magnesium alloy. The friction material 102 is disposed on at least a region of a backing plate 104 of the brake pad 100. Advantageously, the region of the backing plate having the friction material 102 is configured to engage with, for example, a brake disk of a brake assembly. In other words, at least a portion of the brake pad 100 that would otherwise be in direct contact with a brake disk during braking is advantageously coated with the friction material 102.

The friction material 102 is a copper-free material. During braking, particulates of a friction material of a brake pad may be expelled into the environment. Copper particulates that can be expelled from copper-based friction materials present a risk of environmental contamination. The brake pad 100, by using copper-free materials, decreases the risk of environmental contamination from continued use.

The friction material 102 is a composition that includes a fibrous form of an aluminum magnesium alloy, a solid lubricant, an abrasive composition, and a remainder that includes a filler and binder. Table 1 below illustrates exemplary amounts by weight for the composition, although other amounts according to the further description below are also contemplated.

TABLE 1

Exemplary Amounts by Weight for the Composition of a Friction Material

| | |
|---|---|
| Aluminum Magnesium Fiber | 8% |
| Solid Lubricant | 5% |
| Abrasive Composition | 15% |
| Filler and Binder | 72% |
| Total | 100% |

The metal fiber, solid lubricant, abrasive composition, and filler materials can be mixed together, and then molded into a matrix by the binder.

An alloy of magnesium and aluminum can be prepared through any customary procedure. In an example, an alloy of aluminum and magnesium is about 4.5% to about 5.6% magnesium by weight. Such an alloy can be given a fibrous form through any customary technique, including wire drawing, and/or a Taylor process. The fibrous form of the aluminum magnesium alloy exhibits increased hardness and strength relative to both un-alloyed fibers and to non-fibrous aluminum magnesium alloys, resulting in the friction material 102 having an increased structural reinforcement that imparts a greater strength than conventional friction materials by a factor of about 10% or more. An amount of the fibrous form of the aluminum magnesium alloy in the composition can range from about 5% to about 9.75% by weight.

The composition also includes a solid lubricant. Lubricants are generally included as a powder or fine particles in friction material compositions in order to reduce wear during braking In the present embodiment, the solid lubricant includes at least one sulfur such as, for example, at least one of $Sb_2S_3$, $SnS_2$, and CaS. In an example, about 5% to about 6% by weight of the friction material 102 is the solid lubricant.

In the present embodiment, the solid lubricant is not a lead-based material. Similar to copper, lead particulates that may be expelled due to wear during braking present a risk of environmental contamination. However, many solid lubricants without lead that have been proposed exhibit a decreased performance under high loading when at high temperatures, relative to lubricants with lead. This can create inconsistencies in brake performance and vehicle stability such as, for example, brake pull, whereby when a vehicle brakes during a turn, a brake assembly acting on an inside wheel will have a difference performance than a brake assembly acting on an outside wheel. By combining a lead-free solid lubricant with the fibrous aluminum magnesium alloy described above, a friction material having consistent performance under operating conditions can be achieved that mitigates risks of environmental contamination through harmful expelled particulates.

The composition also includes about 13% to about 17% by weight of an abrasive composition. Abrasives are typically classified according to the Mohs hardness scale. Examples of abrasives include alumina, magnesium oxide, zirconium silicate, silica, silicon dioxide, sand, silicon carbide, mullite, mica, iron chromite, and mineral silicates such as calcium magnesium silicate, calcium zirconium silicate, calcium magnesium aluminum silicate, and magnesium aluminum silicate. Abrasives rated higher on the Mohs hardness scale are generally included in lower concentrations than abrasives rated lower on the Mohs hardness scale.

A remainder of the composition includes filler that can be used to create desired performance characteristics such as provide noise reduction, reduce cost, modify weight or bulk, improve coating properties, etc., and a binder that molds other components in the composition into a matrix. Advantageously, a portion of the filler accounting for about 7% to about 10% by weight of the composition is an organic filler composition that can include, for example, at least one of melamine dust, polymerized cashew nut shell liquid dust, and ground rubber pellets. A remaining portion of the filler can be an inorganic filler that accounts for about 30% to about 65% by weight of the composition, and that includes, for example, at least one of calcium carbonate, barium sulfate, and carbon fluoride. Other examples of materials that can be included in the filler include graphite, petroleum coke, calcium oxide, calcium hydroxide, calcium silicate, and various grades of friction dust.

The binder is used to develop a matrix that holds other components in the composition together. Advantageously, the composition is molded into a thermosetting matrix, such as by a phenol-formaldehyde resin, such that the friction material 102 forms as a rigid heat resistant composite suitable for brake pads for automotive use. In an example, about 7% to about 21% of the composition by weight is the binder. In another example, about 7.5% to about 10% of the composition by weight is the binder. In a further example, about 9.2% of the composition by weight is binder.

The friction material 102, formed into a pad or lining, can be applied to the backing plate 104 via, for example, an adhesive, rivets, or any other customary procedure. In an embodiment, the pad of friction material 102 is formed around a metal tang, and/or another element such as a friction material wear indicator.

While a friction material has been described above as being disposed or coated upon a backing plate of a brake pad, it should be understood that a friction material according to the present disclosure could be similarly applied to other surfaces. For example, the friction material can be disposed upon at least a region of a brake disk, brake drum, clutch plate, or any other surface that may be subject to abrasion during use. Additionally, while brake pads of an automotive vehicle have been described above, the friction material of the present disclosure is not limited to automotive vehicles, and can be applied to, for example, bicycles, motorcycles, airplanes, or other mechanism having brake assemblies or otherwise abraded surfaces.

Figure 4:
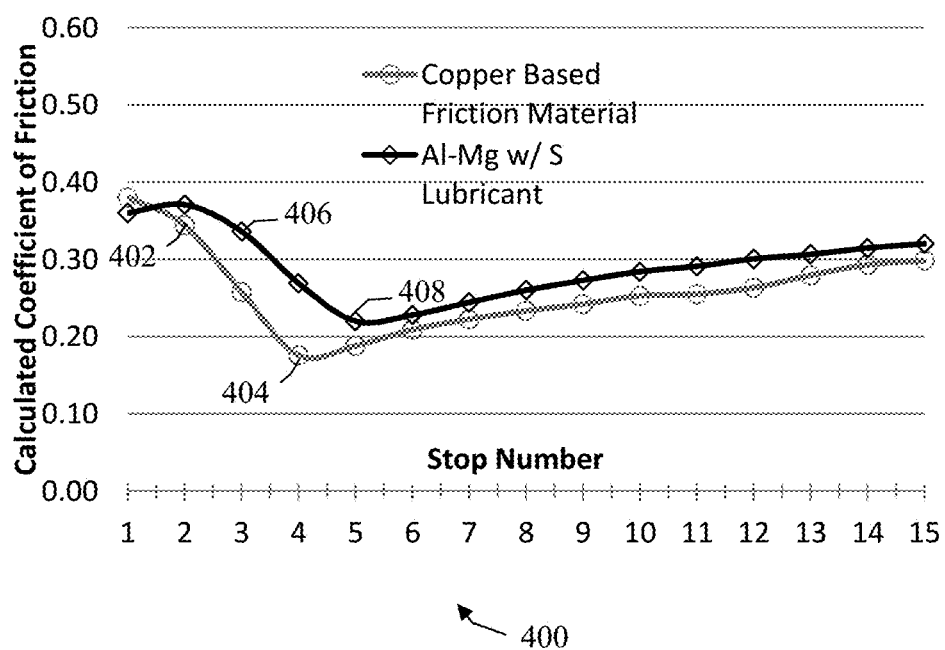
FIG. 4 is a graph illustrating initial fade friction levels of a copper-based friction material and of a friction material according to the present disclosure.

FIG. 4 illustrates a graph 400 of initial fade friction levels of a friction material according to the present disclosure compared to a customary copper-based friction material via SAE J2522, an Inertia Dynamometer Test procedure that assesses behavior of friction material with regard to pressure, temperature, and speed.

Initial fade, first fade, or green fade, refers to a phenomenon whereby brake linings exhibit decreased performance after a series of heavy braking applications soon after installation. Heat exposure and wear caused by braking can cause materials in top layers of friction materials to form and expel gasses until such gas-forming materials are exhausted. These gasses often form at pressures high enough to, for example, separate a brake pad from a brake disk during braking, and in turn reduce the friction properties of the friction material.

As shown in FIG. 4, the customary copper-based friction material experiences a steep initial fade after only two sequential braking applications, and quickly drops at 402 from a $\mu_d$ of about 0.39 to a $\mu_d$ of about 0.19 at 404. Comparatively, the friction material according to the present disclosure experiences an initial fade after three sequential braking applications, and only drops from a $\mu_d$ of about 0.39 at 406 to a $\mu_d$ of about 0.23 at 408.

Figure 5:
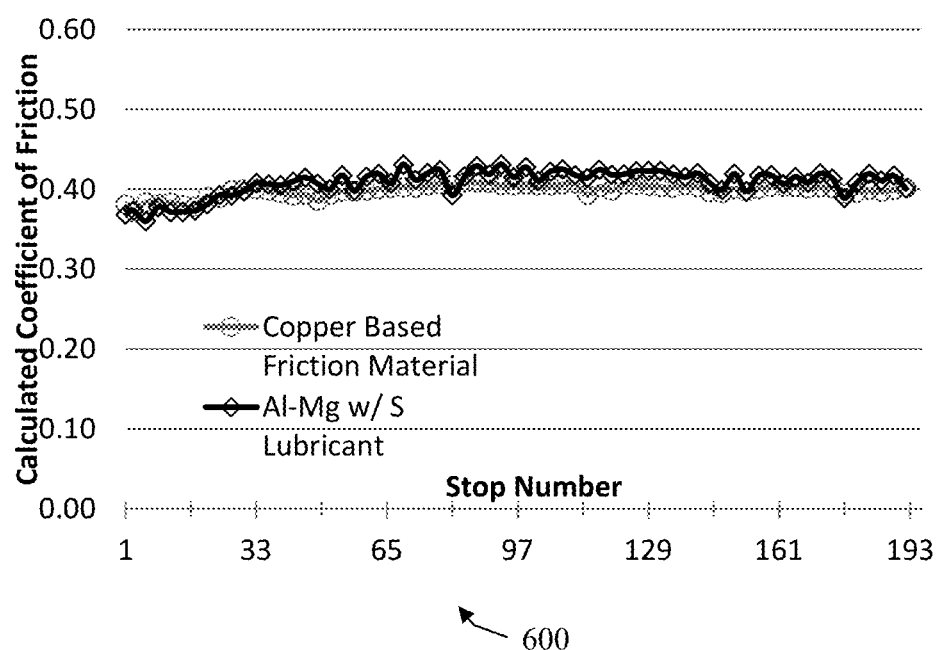
FIG. 5 is a graph illustrating burnished friction levels of a copper-based friction material and of a friction material according to the present disclosure.

FIG. 5 illustrates a graph 500 of burnished friction levels of a friction material according to the present disclosure compared to a customary copper-based friction material via SAE J2522. One method of mitigating the effects of initial fade is via scorching or burnishing. Burnishing is a method of preconditioning at least the top layers of the friction material by subjecting the friction material to bursts of mechanical force and/or heat prior to installation. Pre-conditioning can also be used to remove surface discontinuities in the surface of the friction material which can improve surface contact between the friction material and brake disk, and thus increase performance. As illustrated in FIG. 5, the friction material according to the present disclosure achieves a steady state $\mu_d$ of about 0.43, compared to the $\mu_d$ of about 0.40 of the conventional copper-based friction material.

However, in some instances, burnishing or scorching can decrease performance of a lubricant in the friction material, which can result in undesirable effects such as brake squeals or vibrations during initial periods of use. Because the initial fade of the friction material according to the present disclosure is decreased relative to that of conventional copper-based friction materials, a less disruptive burnishing process can be utilized. Additionally, selection of a solid lubricant having a higher thermal tolerance can mitigate at least a portion of the performance decrease in the lubricant caused by scorching.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

The invention claimed is:
1. A brake member for an automotive vehicle, comprising:
a substrate; and
a friction lining disposed over at least a region of the substrate, wherein the friction lining is formed from a composition that consists of:
about 5% to about 6% by weight of a solid lubricant;
about 5% to about 9.75% by weight of a fibrous form of an aluminum-magnesium alloy;
about 13% to about 17% by weight of an abrasive composition;
about 7% to about 10% by weight of an organic filler composition; and
about 57.25% to about 70% by weight of a remainder that includes at least one of an inorganic filler and a binder.

2. The brake member according to claim 1, wherein the friction lining is copper-free.

3. The brake member according to claim 1, wherein the solid lubricant is lead-free.

4. The brake member according to claim 3, wherein the solid lubricant includes a sulfur.

5. The brake member according to claim 1, wherein the aluminum-magnesium alloy is from about 4.5% to about 5.6% by weight of magnesium.

6. The brake member according to claim 1, wherein the abrasive composition includes at least one of an alumina, magnesium oxide, zirconium silicate, silica, silicon dioxide, sand, silicon carbide, mullite, mica, iron chromite, calcium magnesium silicate, calcium zirconium silicate, calcium magnesium aluminum silicate, and magnesium aluminum silicate.

7. The brake member according to claim 1, wherein the organic filler composition includes at least one of melamine dust, polymerized cashew nut shell liquid dust, and ground rubber particles.

8. The brake member according to claim 1, wherein the inorganic filler includes at least one of calcium carbonate, barium sulfate, and calcium fluoride.

9. The brake member according to claim 1, wherein the binder molds the solid lubricant, the fibrous form of the aluminum-magnesium alloy, the abrasive composition, the organic filler composition, and the inorganic filler into a thermosetting matrix to form the friction lining.

10. The brake member according to claim 9, wherein the binder includes phenol-formaldehyde.

11. The brake member according to claim 1, wherein the remainder consists of:
the binder, which is about 7% to about 21% of the composition by weight; and
the inorganic filler, which is about 49% to about 63% of the composition by weight.

12. The brake member according to claim 1, wherein the solid lubricant includes at least one of $Sb_2S_3$, $SnS_2$, and CaS.

13. A brake assembly for an automotive vehicle, comprising:
a brake disk: and
a brake pad that includes:
a backing plate; and
a copper-free friction pad disposed on at least a region of the backing plate, wherein the friction pad is formed from a composition that consists of:
about 5% to about 6% by weight of a lead-free solid lubricant that includes a sulfur;
about 5% to about 9.75% by weight of a fibrous form of an aluminum-magnesium alloy;
about 13% to about 17% by weight of the abrasive composition;
about 7% to about 10% by weight of an organic filler composition; and about 7% to about 21% by weight of a remainder that includes an inorganic filler and a binder.

14. The brake assembly according to claim 13, wherein the aluminum-magnesium alloy is from about 4.5% to about 5.6% by weight of magnesium.

15. A copper-free friction material composition that consists of:
- about 5% to about 6% by weight of a lead-free solid lubricant;
- about 5% to about 9.75% by weight of a fibrous form of an aluminum-magnesium alloy;
- about 13% to about 17% by weight of an abrasive composition;
- about 7% to about 10% by weight of an organic filler composition; and
- about 57.25% to about 70% by weight of a remainder that includes an inorganic filler and a binder.

16. The friction material composition according to claim 15, wherein the aluminum-magnesium alloy is from about 4.5% to about 5.6% by weight of magnesium.

17. The friction material composition according to claim 15, wherein the binder molds the solid lubricant, the fibrous form of the aluminum-magnesium alloy, the abrasive composition, the organic filler composition, and the inorganic filler into a thermosetting matrix to form the friction lining.

18. The friction material composition according to claim 15, wherein the remainder consists of:
- the binder, which is about 7% to about 21% of the composition by weight; and
- the inorganic filler, which is about 49% to about 63% of the composition by weight.

* * * * *